United States Patent
Hansen et al.

(10) Patent No.: US 6,708,820 B2
(45) Date of Patent: Mar. 23, 2004

(54) SHIPPING AND/OR DISPLAY PACKAGE FOR DISC AND METHOD FOR MANUFACTURING SAME

(75) Inventors: Roger P. Hansen, Rockford, MI (US); L. D. Peoples, Morley, MI (US); Harold E. Montgomery, Grand Rapids, MI (US)

(73) Assignee: Display Pack, Inc., Grand Rapids, MI (US)

(*) Notice: Subject to any disclaimer, the term of this patent is extended or adjusted under 35 U.S.C. 154(b) by 72 days.

(21) Appl. No.: 09/824,328

(22) Filed: Apr. 2, 2001

(65) Prior Publication Data

US 2002/0139699 A1 Oct. 3, 2002

(51) Int. Cl.7 ............................................. B65D 85/30
(52) U.S. Cl. .................................... 206/308.1; 206/806
(58) Field of Search ........................ 206/308.1, 309, 206/312, 449, 806, 232, 470, 471, 775, 776, 777, 778, 472, 475, 303; 53/452, 456, 467, 473, 476, 477

(56) References Cited

U.S. PATENT DOCUMENTS

| | | | |
|---|---|---|---|
| 3,549,225 A | * 12/1970 | Scaccia | 312/9.9 |
| 4,020,694 A | * 5/1977 | Mayhew | 206/461 |
| 4,640,413 A | 2/1987 | Kaplan et al. | |
| 4,739,883 A | * 4/1988 | Mohs et al. | 206/461 |
| 4,819,799 A | * 4/1989 | Nomula et al. | 206/308.1 |
| 4,844,260 A | 7/1989 | Jaw | |
| 5,129,516 A | * 7/1992 | Theros | 206/389 |
| 5,429,233 A | * 7/1995 | Juaristi | 206/461 |
| 5,485,919 A | * 1/1996 | Samberg et al. | 206/278 |
| 5,511,659 A | 4/1996 | Bosworth | 206/308.1 |
| 5,595,293 A | * 1/1997 | Miller | 206/308.1 |
| 5,609,253 A | 3/1997 | Goade, Sr. | |
| 5,682,990 A | 11/1997 | Schluger | |
| 5,695,059 A | * 12/1997 | Reich | 206/427 |
| 5,697,496 A | 12/1997 | Bauer | |
| 5,740,915 A | 4/1998 | Williams | |
| 5,760,381 A | 6/1998 | Stich et al. | |
| 5,777,305 A | 7/1998 | Smith et al. | |
| 5,791,474 A | 8/1998 | Hansen | |
| 5,842,629 A | 12/1998 | Sprague et al. | |
| 5,901,844 A | * 5/1999 | Gambardella et al. | 206/308.1 |
| 5,918,909 A | 7/1999 | Fiala et al. | |
| 5,921,386 A | * 7/1999 | Smith | 206/308.1 |
| 6,003,254 A | * 12/1999 | Lorber | 206/312 |
| 6,016,913 A | * 1/2000 | Tilton | 206/470 |
| 6,059,101 A | * 5/2000 | Gambardella et al. | 206/308.1 |
| 6,109,439 A | 8/2000 | Goade, Sr. | |
| 6,155,410 A | * 12/2000 | Davis | 206/39.5 |
| 6,182,823 B1 | * 2/2001 | Rinde | 206/232 |
| 6,241,085 B1 | * 6/2001 | Koehn | 206/308.1 |
| 6,290,060 B1 | * 9/2001 | Burtch | 206/308.1 |
| 6,349,823 B1 | * 2/2002 | Innis | 206/308.1 |
| 6,415,976 B1 | * 7/2002 | Flynn et al. | 229/71 |

* cited by examiner

*Primary Examiner*—Shian Luong
(74) *Attorney, Agent, or Firm*—Warner Norcross & Judd LLP

(57) ABSTRACT

A shipping and/or display package for a disc. The package includes front and rear panels that are closed about the disc. Each of the first and second panels includes a disc-shaped embossed portion having a depth of approximately one half the thickness of the disc. The embossed regions cooperatively define a disc cavity that closely receives the disc. The front panel defines a window that permits viewing of the disc. The package further includes a transparent film extending over the window. The rear panel may include a plurality of die cut fingers positioned about the embossed region to aid in retaining the disc in the embossed region during packaging. The rear panel may also include a friction coating applied within the embossed region to further aid in retaining the disc in the embossed region during packaging.

20 Claims, 7 Drawing Sheets

SHIPPING AND/OR DISPLAY PACKAGE FOR DISC AND METHOD FOR MANUFACTURING SAME

BACKGROUND OF THE INVENTION

The present invention relates to packaging and more particularly to a shipping and/or display package for a compact disc, digital video disc or other like object.

Compact discs and digital video discs are widely and increasingly used to distribute music, movies and computer software. One specific area in which the use of compact discs is growing rapidly is the area of computer software. Because of their low cost and relatively durable nature, compact discs containing software are commonly packaged and shipped directly to consumers.

Various shipping packages are available for use in shipping discs to consumers. However, because of the unique nature of compact discs, many conventional constructions used with other articles are unacceptable or undesirable. For example, with compact discs it is undesirable to secure the disc to the package by adhesives or other similar materials because removal of the adhesive may result in damage to the disc and, if the adhesive is not fully removed, it may result in damage to expensive disc drives. It is also desired to protect the disc from direct impact and direct contact. In addition to these special concerns, disc packages are subject to many conventional concerns. For example, low cost, lightweight and easily packaged designs are desirable. It is also desirable to provide packaging with ample area for graphics and other printed material that advertise, promote or provide instructions for the enclosed product.

One conventional disc package includes a compact disc enclosed loosely between a pair of paperboard panels. With this type of package, the compact disc is typically hidden from view and therefore does not make use of the aesthetic appeal of the compact disc. Further, the disc is largely free to shift within the package, thereby increasing the risk of damage to the disc, for example, by scratching or by the force impact.

In an effort to leverage the aesthetic appeal of the disc, an alternative conventional package includes a shallow blister that is mounted between two panels to hold the disc. The blister is preformed and defines a disc-shaped cavity adapted to closely receive the disc where it is visible even when packaged. The blister also includes a flange that is trapped between the panels to hold the blister in place. Although a marked improvement, the use of a pre-formed blister increases the cost and complexity of the manufacturing process.

SUMMARY OF THE INVENTION

The aforementioned problems are overcome by the present invention wherein a package is provided with front and rear panels, each of which includes a disc-shaped embossed region. Each embossed region has a depth of approximately one-half the width of the disc to be packaged such that when closed together the regions closely receive and hold the disc. The front panel defines a window that permits viewing of the disc.

In a preferred embodiment, a plurality of die cuts is defined about the periphery of the embossed region in the rear panel. The die cuts provide narrow fingers that help to maintain the disc within the embossed region during manufacture.

In a more preferred embodiment, a friction coating is applied to the embossed region of the rear panel. The friction coating is preferably a waterbased coating having a high coefficient of friction that helps to maintain the disc in the embossed region during manufacture.

In an even more preferred embodiment, a transparent film covers the window. The film is preferably a planer sheet of film having sufficient flexibility to comform to the shape of the disc.

The present invention also provides a method for packaging a disc including the general steps of (a) die cutting a blank defining front and rear panels, (b) embossing the front and rear panels to define a disc shaped recess of approximately one-half the thickness of the disc in each, (c) die cutting a window in the front panel, the window being smaller in diameter than the disc, (d) securing a transparent film over the window, (e) inserting a disc into the embossed region, and (f) gluing the front and rear panels together about the disc. In a preferred embodiment, the method includes the additional step of forming die cuts around the periphery of the embossed region of the rear panel. The method may further include the step of applying a friction coating to the embossed region of the rear panel.

The present invention provides a simple and inexpensive shipping or display package for a compact disc, digital video disc or other like object. By embossing the front and rear panels, the depth of the embossments is reduced, thereby reducing the likelihood of damage to the paperboard panels during shipping and providing a clean appearance. Further, the embossed panels eliminate the need for a preformed blister to house the disc and instead permit the use of an inexpensive transparent sheet. The die cuts and friction coating help to locate and retain the disc in the embossed regions during manufacture. Also, the flexible film conforms to the shape of the disc, providing the appearance of a preformed blister. If desired, the package can be provided with a hanging hole that permits the package to function as a display package.

These and other objects, advantages, and features of the invention will be readily understood and appreciated by reference to the detailed description of the preferred embodiment and the drawings.

DETAILED DESCRIPTION OF THE PREFERRED EMBODIMENT

Figure 1:
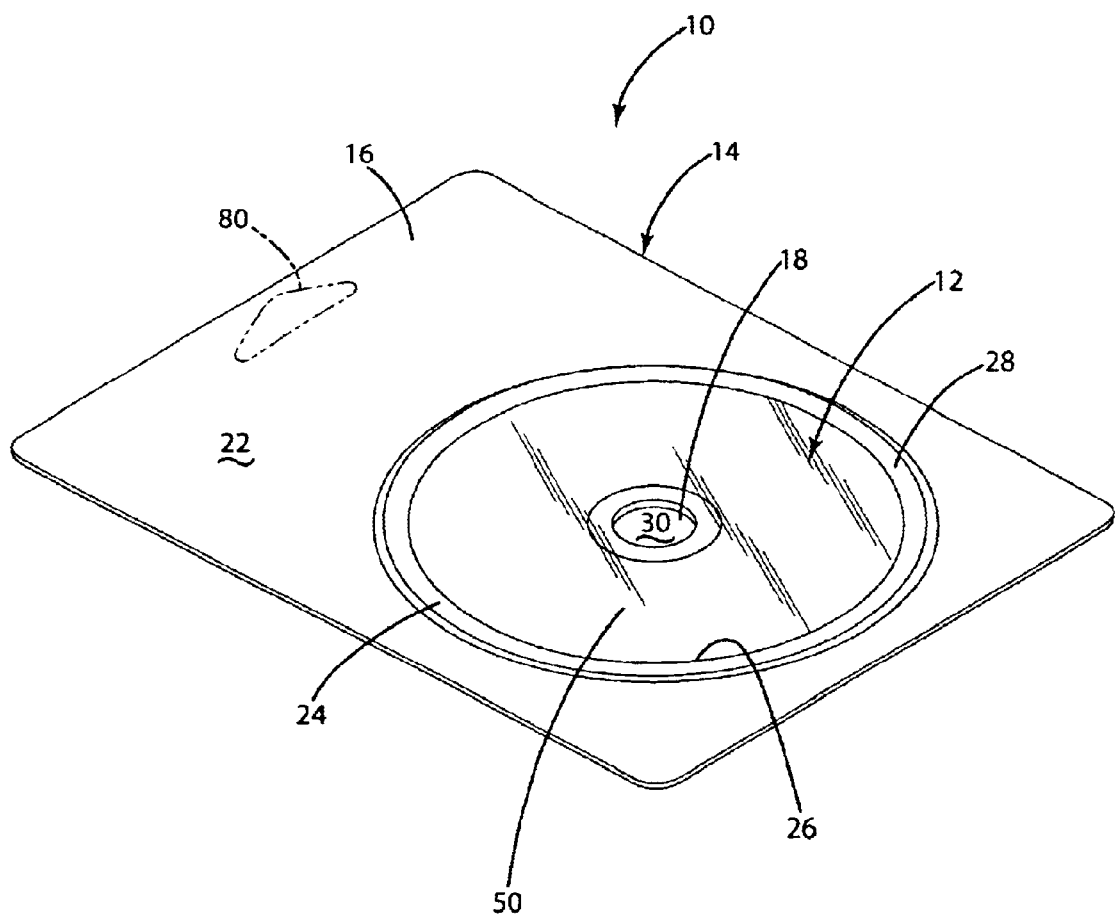
FIG. 1 is a perspective view of a packaged disc according to a preferred embodiment.
Figure 2:
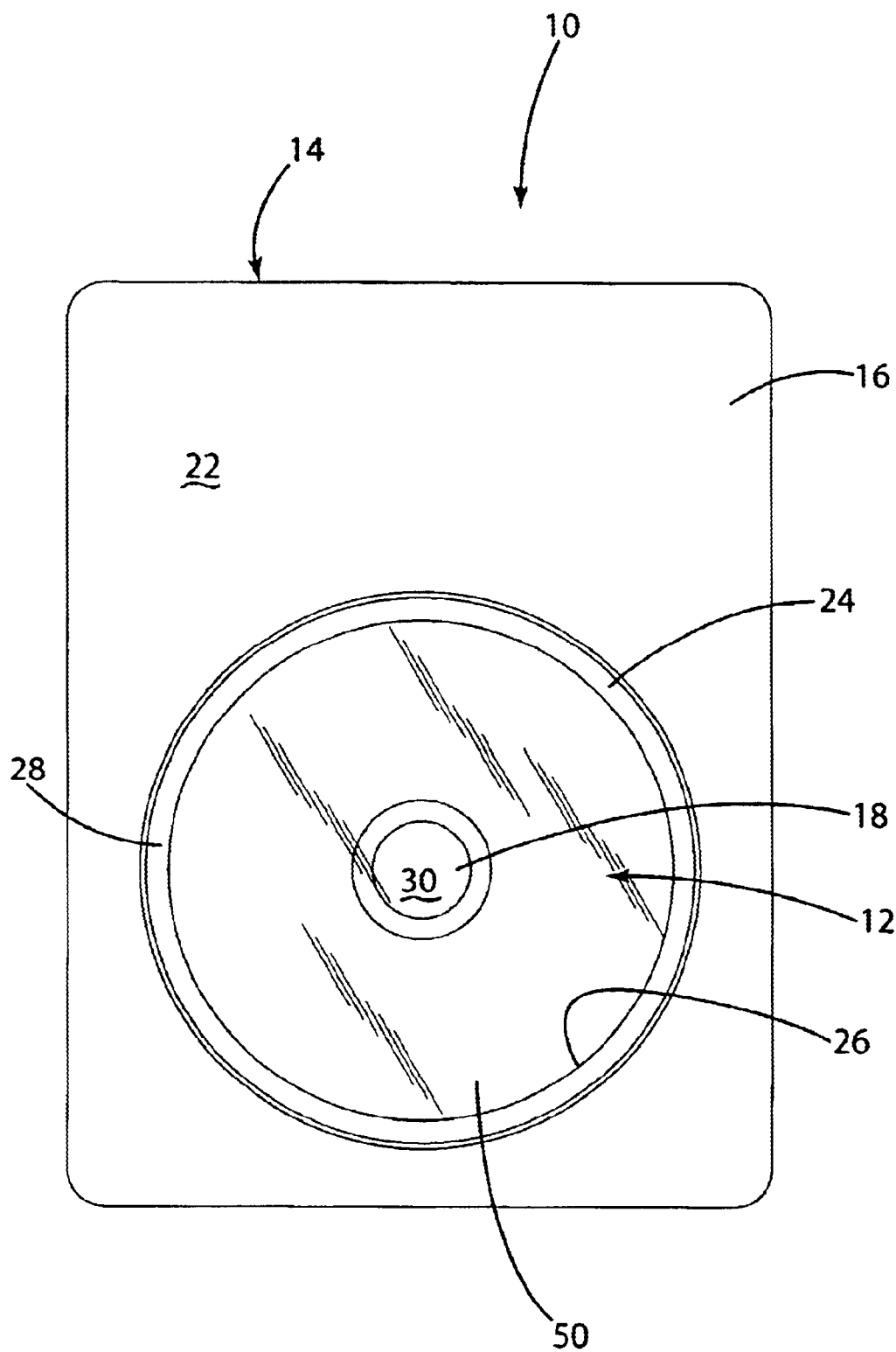
FIG. 2 is a top plan view of the packaged disc.
Figure 3:
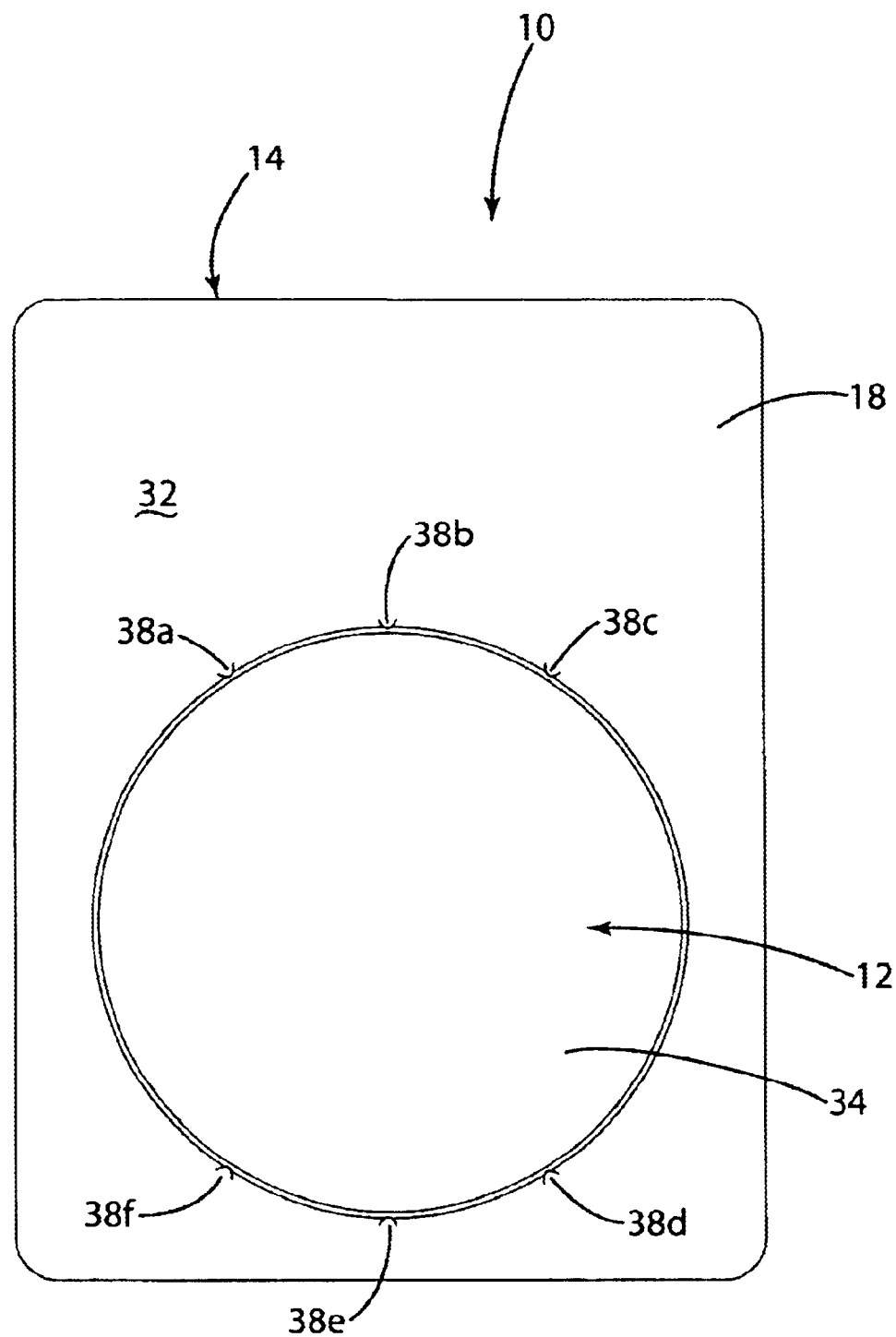
FIG. 3 is a bottom plan view of the packaged disc.
Figure 4:
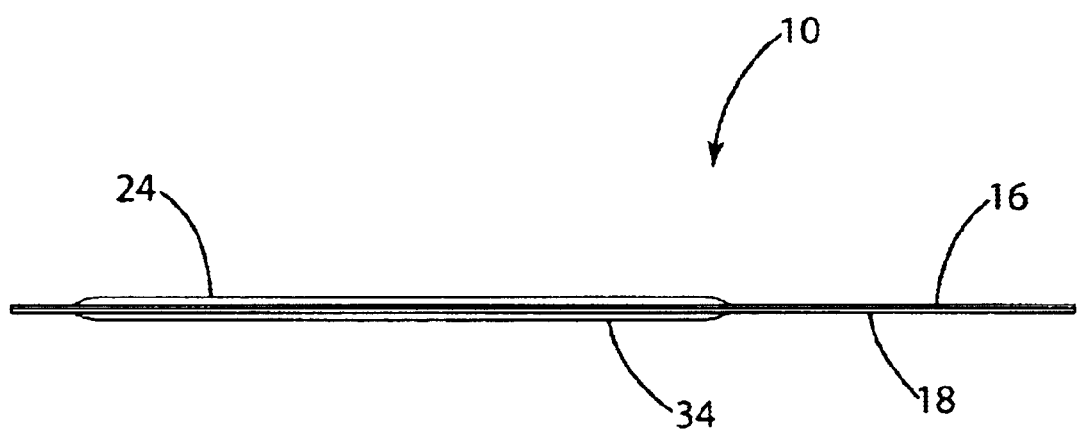
FIG. 4 is a side elevational view of the packaged disc.

A combination disc and package according to a preferred embodiment of the present invention is shown in FIG. 1 and generally designated 10. The combination 10 includes a disc 12, such as a compact disc ("CD"), digital video disc ("DVD") or other similar discs, and a package 14 containing the disc 12. The package 14 includes front 16 and rear 18 panels that close about and secure the disc 12 in place. The front panel 16 defines a window 26 that permits viewing of the packaged disc. Although the present invention is described in connection with the packaging of a conventional circular compact disc, it is well suited for use in connection with other discs as well as other similarly flat and thin articles. For example, the present invention is well suited for use with "credit card" style discs, which are currently gaining popularity in the industry. Credit card style discs are substantially smaller than conventional discs and are typically not fully circular, often including two or more linear edges. Further, the present invention is described in the context of a shipping package. The present invention can be readily modified to also (or alternatively) function as a point-of-sale display package, for example, by adding a hanging hole 80 as shown in phantom lines in FIG. 1.

The front panel 16 is a generally rectangular, planar sheet of paperboard. The front panel 16 includes an inner surface 20 and an outer surface 22. The front panel 16 includes an embossed region 24 having a depth of approximately one-half of the thickness of the disc 12. The embossed region 24 is preferably circular and includes a diameter slightly larger than the diameter of the disc 12 so that the embossed region 24 closely receives the disc 12. The front panel 16 defines a window 26 in the embossed region 24 that permits viewing of the packaged disc 12. Preferably, the window 26 is a circular opening and is concentric with the embossed region 24. The window 26 preferably includes a diameter that is somewhat smaller than the diameter of the disc 12, thereby leaving a flange portion 28 covering the peripheral edge of the packaged disc 12. The front panel 16 preferably includes a transparent film 50 covering the window 26. The transparent film 50 is preferably a thin and flexible sheet of polyester or other similar flexible, transparent material. The film 50 is preferably a rectangular sheet having sufficient dimensions to extend beyond the embossed region 24 such that it can be secured to the inner surface 20 of the front panel 16 outside of the embossed region 24, for example, by conventional adhesives.

In an alternative embodiment, the window may be larger in diameter than the disc 12, thereby eliminating the need to emboss the front panel 16. In this alternative embodiment, the film 50 covers the disc 12 retaining it within the package.

Figure 5:
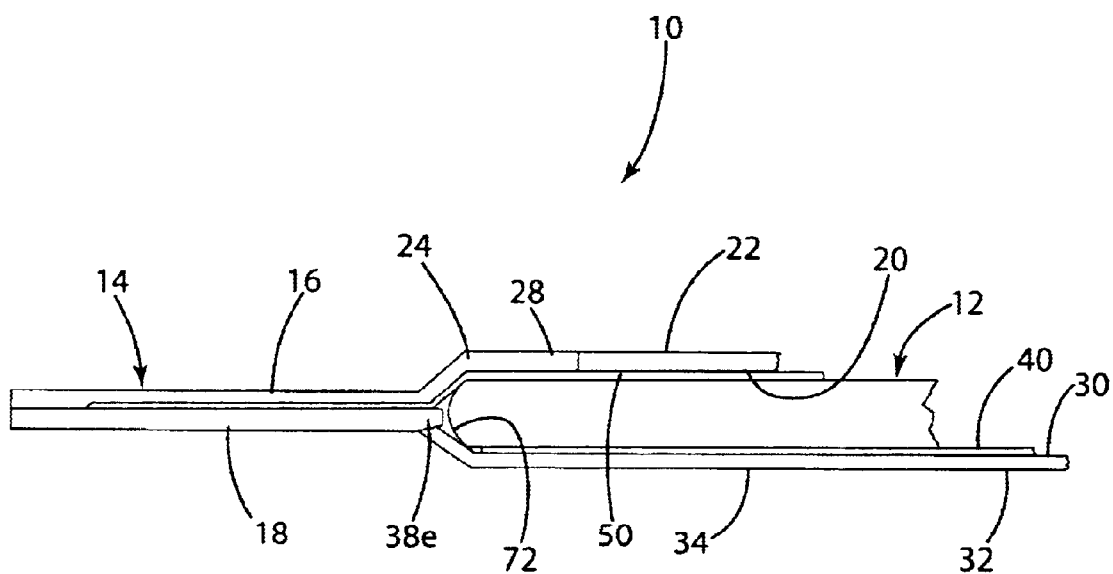
FIG. 5 is a sectional view of a portion of the packaged disc taken along a line showing a disc retaining finger.
Figure 7:
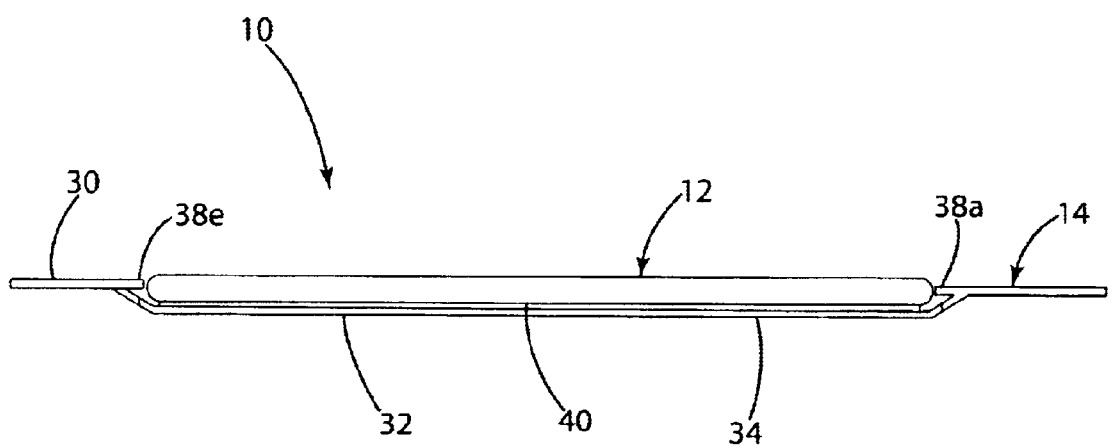
FIG. 7 is a sectional view of a portion of the blank showing the disc positioned in the embossed region.

The rear panel 18 is also a generally rectangular, planar sheet of paperboard. The rear panel 18 is preferably dimensioned to be coextensive with the front panel 14 when the two panels 16 and 18 are closed about the disc 12. The rear panel 18 includes an inner surface 30 and an outer surface 32. The rear panel 18 includes an embossed region 34 having a depth of approximately one-half of the thickness of the disc 12. The embossed region 34 is preferably circular and includes a diameter slightly larger than the diameter of the disc 12 so that, like the embossed region 24 of the front panel 16, the embossed region 34 closely receives the disc 12. The embossed regions 24 and 34 of the front 16 and 18 rear panels are positioned to align with one another to define a disc cavity 72 when the front 16 and rear 18 panels are closed about the disc 12. The rear panel 18 preferably includes a plurality of die cuts 36a–f disposed about and just outwardly from the periphery of the embossed region 34. In the illustrated embodiment, the die cuts 36a–f are arcuate in shape and are configured to define a plurality of small fingers that extend inwardly toward the embossed region 34 along the plane of the rear panel 18. The fingers 38a–f preferably extend slightly into the embossed region 34 to help to retain the disc 12 in the embossed region 34 during the manufacturing process. A friction coating 40 may be applied to the embossed region 34 of the rear panel 18 to further help in retaining the disc 12 in the embossed region 34 during manufacture (See FIGS. 5 and 7). Alternatively, the friction coating 40 may be applied to the entire inner surfaces 20 and 30 of the front 16 and rear 18 panels. The friction coating 40 is preferably a thin layer of a waterbased or other similar material. One material found to be a suitable coating is available from Wikoff Color Corp. as Product No. SCW4675.

Manufacture and Assembly of Package

Figure 6:
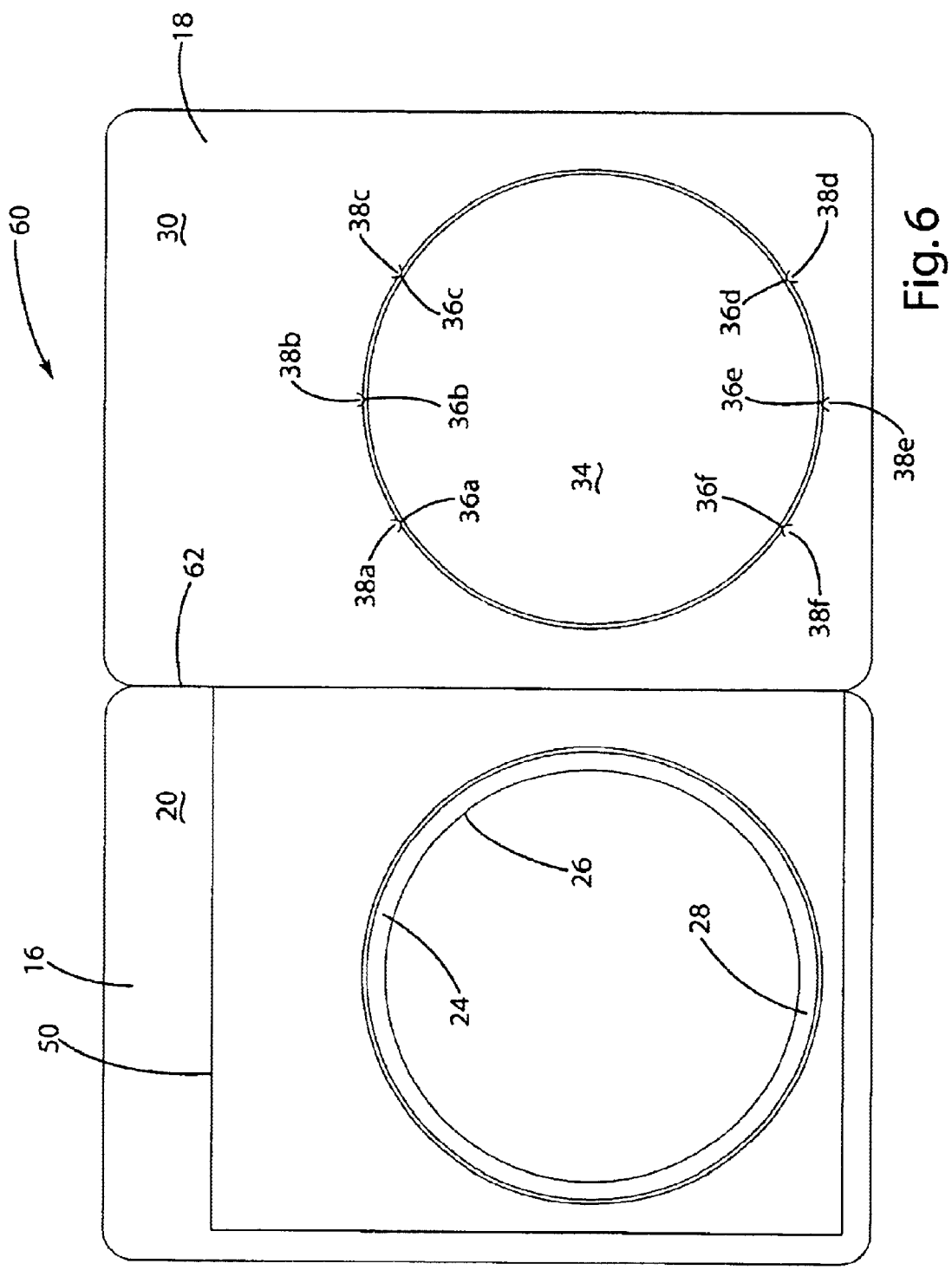
FIG. 6 is a top plan view of a blank.

The present invention is manufactured using generally conventional manufacturing and packaging apparatus. As shown in FIG. 6, the package 14 is manufactured from a die cut paperboard blank 60. The blank 60 is preferably manufactured from a 12 point paperboard, however, the specific material will vary from application to application. The blank 60 includes front panel 16 and rear panel 18 joined together along fold line 62. The fold line 62 can be scored, perforated or partially cut (e.g. cut only partially through the thickness of the blank 60) to facilitate formation of straight fold. The embossed regions 24 and 34 are formed in the blank 60 using conventional embossing techniques and apparatus. Similarly, the window 26 is die cut into the front panel 16 and the die cuts 36a–f are cut into the rear panel 18 using conventional techniques and apparatus. The blank 60, including window 26, die cuts 36a–f and embossed regions 24 and 34, is preferably formed in a single operation, but can be formed in separate operations as desired. Any desired graphics or other printed information can be applied to the blank 60, for example, on outer surfaces 22 and 32, either before or after the die cutting operation. The friction coating 40 is preferably applied to the rear panel 18 before the embossed region 34 is formed using conventional coating machinery. As noted above, the friction coating 40 can cover all or only a portion of the panels 16 and 18.

Once the blank 60 is formed, the transparent film 50 is secured to the inner surface 20 of the front panel 16. The film 50 is preferably cut using conventional techniques and apparatus from a conventional transparent film, such as polyester. The film 50 extends beyond the embossed region 24 where it is adhesively secured to the inner surface 20. The film 50 is attached by first applying a layer of suitable adhesive, such as Capital 40603P adhesive, to the inner surface 20 of the front panel 16 or to the outer surface of the film 50 or to both. The film 50 is then secured to the front panel 16 by placing the film 50 in position on the front panel 16 covering the window 26. Attachment of the film 50 is preferably performed by conventional gluing machinery.

The disc 12 is then packaged, preferably using a conventional multiple station packaging machinery. First, the disc 12 is placed into the embossed region 34 of the rear panel 18 (See FIG. 7). The fingers 38a–f and friction coating 40 help to retain the disc 12 in place within the embossed region 34 of the rear panel 18. The blank 60 and disc 12 are then moved to a gluing station that applies a layer of adhesive or cement (not shown) to the either or both of the inner surfaces of the front 16 and rear 19 panels. The adhesive is preferably applied at least along the peripheral edges of the front 16 and/or rear 18 panels and also around the periphery of, but not within, the embossed regions 24 and 34. In this way, the completed package 10 will have cleanly sealed external edges and the disc 12 will be tightly held within the embossed regions 24 and 34. If desired, the adhesive can be applied before the disc 12 is placed on the blank 60. The blank 60 and disc 12, with adhesive applied, are moved to a folding station. The folding station folds the blank 60 in half along fold line 62. More specifically, the folding machine folds the front panel 16 over onto the rear panel 18 so that the disc 12 is not displaced during the folding operation. During the folding operation, the embossed portion 24 of the front panel 16 aligns with the embossed portion 34 of the rear panel 18 to closely entrap the disc 12 within a disc cavity 72. Further, the disc 12 causes the film 50 to conform to the shape of the disc 12 and the embossed region 24 giving the appearance of a shaped blister.

The above description is that of a preferred embodiment of the invention. Various alterations and changes can be made without departing from the spirit and broader aspects of the invention as defined in the appended claims, which are to be interpreted in accordance with the principles of patent law including the doctrine of equivalents. Any reference to claim elements in the singular, for example, using the articles "a," "an," "the" or "said," is not to be construed as limiting the element to the singular.

The embodiments of the invention in which an exclusive property or privilege is claimed are defined as follows:

1. A package assembly comprising:
   a disc containing digital information, said disc having a thickness and a first circumference;
   a front paperboard panel; and
   a rear paperboard panel, said front panel and said rear panel cooperatively defining a disc cavity having a second substantially complete circumference, at least one of said front panel and said rear panel being embossed to provide said disc cavity with a depth of about said thickness of said disc;
   wherein substantially all of said first circumference is nested within said second circumference and sandwiched between said front panel and said rear panel within said disc cavity, said front panel and said rear panel adequately intersecured with at least a seal disposed substantially around said first circumference so that said disc is entrapped between said front panel and the rear panel and is incapable of being removed therefrom without at least one of disrupting said seal and damaging at least one of the front panel and the rear panel.

2. The assembly of claim 1 wherein said front panel includes an embossed region with a depth of about one-half said thickness of said disc.

3. A package assembly comprising:
   a disc containing digital information, said disc having a thickness;
   a front paperboard panel;
   a rear paperboard panel, said front panel and said rear panel cooperatively defining a disc cavity, at least one of said front panel and said rear panel being embossed to provide said disc cavity with a depth of about said thickness of said disc;
   wherein said disc is disposed between said front panel and said rear panel within said disc cavity;
   wherein said front panel includes an embossed region defining a depth of about one-half said thickness of said disc; and
   wherein said rear panel includes a plurality of die cuts disposed about said embossed region of said rear panel, said plurality of die cuts extending into said embossed region of said rear panel.

4. The assembly of claim 3 wherein said front panel and said rear panel are joined together along a fold line.

5. The assembly of claim 4 wherein a film is secured to said front panel by an adhesive outside of said embossed region.

6. The assembly of claim 5 wherein said disc and said embossed region of said front panel are circular, said front panel defining a window, said window being circular and concentric with said embossed region.

7. The assembly of claim 6 further comprising a friction coating disposed in said embossed region of said rear panel.

8. A packaged disc comprising:
   a first paperboard panel;
   a second paperboard panel disposed adjacent to and substantially coextensive with said first panel, at least one of said first panel and said second panel having a circular embossed region, said first panel and said second panel cooperatively defining a disc cavity having a cavity depth defined by said embossed region of said at least one of said first panel and said second panel; and
   a disc disposed within said disc cavity, said disc having a thickness substantially equal to said depth of said disc cavity, said disc is bounded by an outer perimeter, wherein substantially all of said outer perimeter is disposed within said disc cavity.

9. A packaged disc comprising:
   a first paperboard panel;
   a second paperboard panel disposed adjacent to and substantially coextensive with said first panel, at least one of said first panel and said second panel having a circular embossed region, said first panel and said second panel cooperatively defining a disc cavity having a cavity depth defined by said embossed region of said at least one of said first panel and said second panel; and
   a disc disposed within said disc cavity, said disc having a thickness substantially equal to said depth of said disc cavity wherein at least one of said first panel and said second panel includes a plurality of die cuts disposed about said embossed region.

10. The packaged disc of claim 9 wherein said plurality of die cuts extend into said embossed region of said rear panel.

11. The packaged disc of claim 10 wherein said first panel and said second panel are joined together along a fold line.

12. The packaged disc of claim 11 wherein at least one of said first panel and said second panel defines a window; and
   further comprising a transparent film disposed over said window, said film being secured to said front panel by an adhesive outside of said embossed region.

13. The packaged disc of claim 12 wherein said embossed region of said front panel is circular, said window being circular and concentric with said embossed region.

14. The packaged disc of claim 13 further comprising a friction coating disposed in said embossed region of said rear panel.

15. A method for packaging a disc, comprising the steps of:
   providing first and second paperboard panels;
   providing a disc;
   embossing at least one of the first panel and the second panel, whereby the assembled package defines a disc cavity having a depth substantially equal to the thickness of the disc and capable of surrounding substantially all of the disc;
   placing the disc within the disc cavity so that substantially all of the disc is disposed within the disc cavity;
   applying an adhesive to at least one of the first panel and the second panel around substantially all of said disc cavity; and closing the first panel and the second panel together about the disc, the disc cavity closely receiving and snuggly retaining the disc, the adhesive joining the first panel and the second panel together so that the first and second panels are in sealing engagement around substantially all of the disc so that the disc is substantially entirely entrapped within the disc cavity and is incapable of being removed from the disc cavity without breaking the sealing engagement between the front and rear panels.

16. The method of claim 15 comprising placing a film adjacent the disc wherein the film is flexible and conforms to a shape of the disc during said closing step.

17. A method for packaging a disc, comprising the steps of:

providing first and second paperboard panels;

providing a disc having a thickness;

embossing at least one of the first panel and the second panel, whereby the assembled package defines a disc cavity, the disc cavity having a depth substantially equal to the thickness of the disc;

placing the disc within the embossed region of one of the first panel and the second panel;

applying an adhesive to at least one of the first panel and the second panel; and closing the first panel and the second panel together about the disc, the disc cavity closely receiving and snuggly retaining the disc and forming die cuts in at least one of the front panel and the rear panel about the embossed region, the die cuts aiding in retaining the disc in the second embossed region during packaging.

18. The method of claim 17 wherein the front panel and rear panel are formed from a contiguous paperboard blank; and further comprising the step of forming a fold line across the blank dividing the blank into the first panel and the second panel, said closing step including folding the first panel onto the second panel.

19. The method of claim 18 wherein said applying step includes applying adhesive about a periphery of at least one of the first panel and the second panel and applying adhesive outside of the periphery of an embossed region.

20. The method of claim 19 further comprising the step of applying a friction coating to at least one of the first panel and the second panel within an embossed region to aid in retaining the disc within an embossed region.

* * * * *